Nov. 4, 1969
W. H. JEROME
3,476,089
POULTRY LOADING DEVICE
Filed Nov. 17, 1967
3 Sheets-Sheet 1
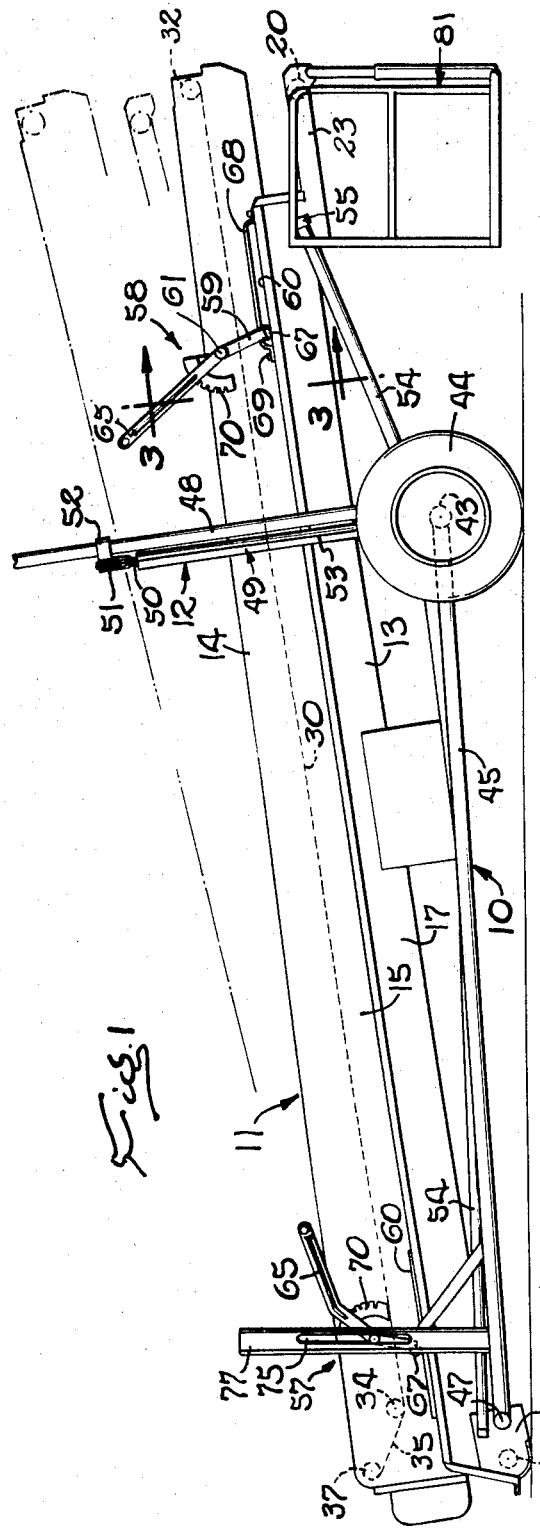
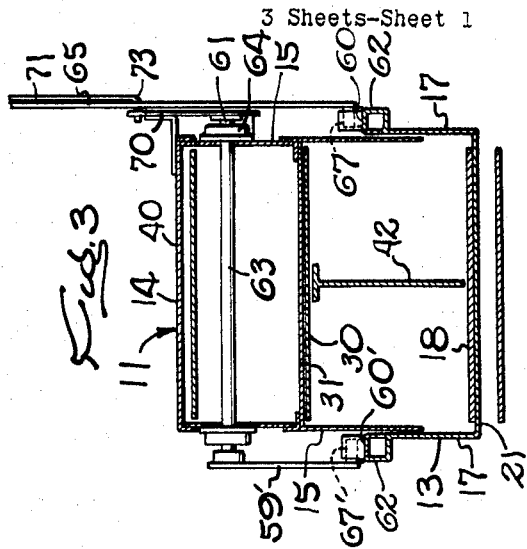
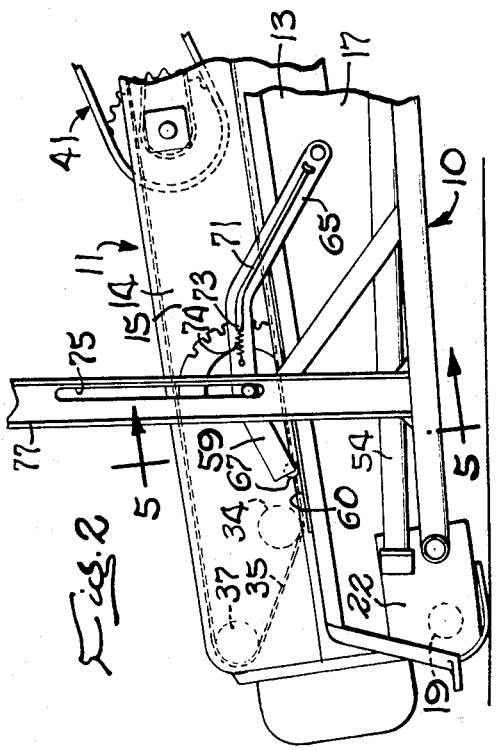
INVENTOR
Wallace H. Jerome
by Wolfe, Hubbard, Voit & Osann
ATTORNEYS Nov. 4, 1969 W. H. JEROME 3,476,089
POULTRY LOADING DEVICE
Filed Nov. 17, 1967 3 Sheets-Sheet 2
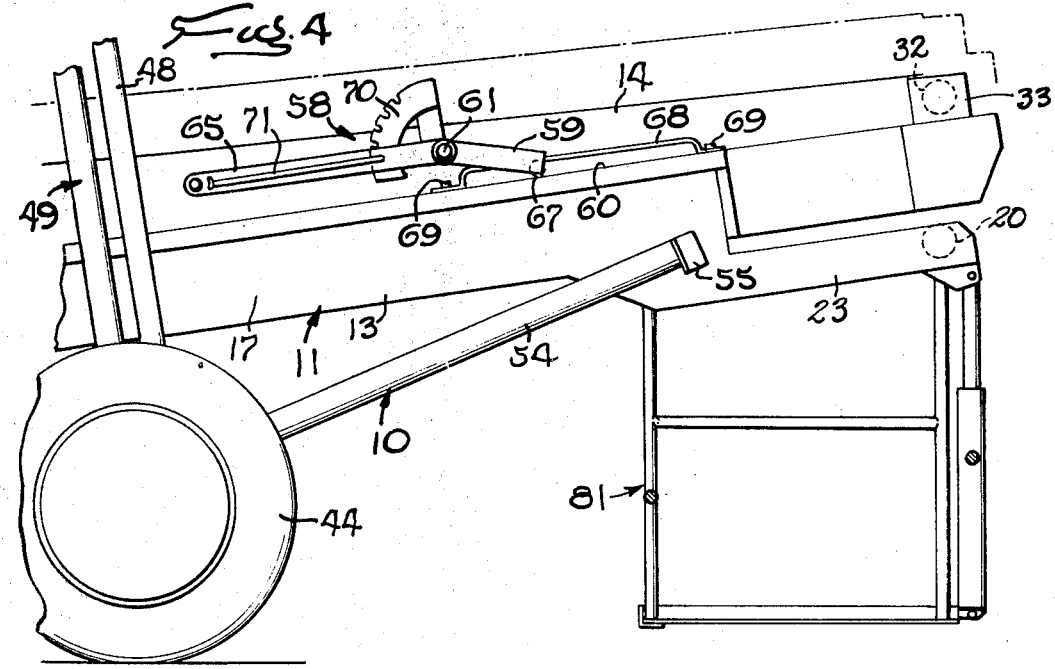
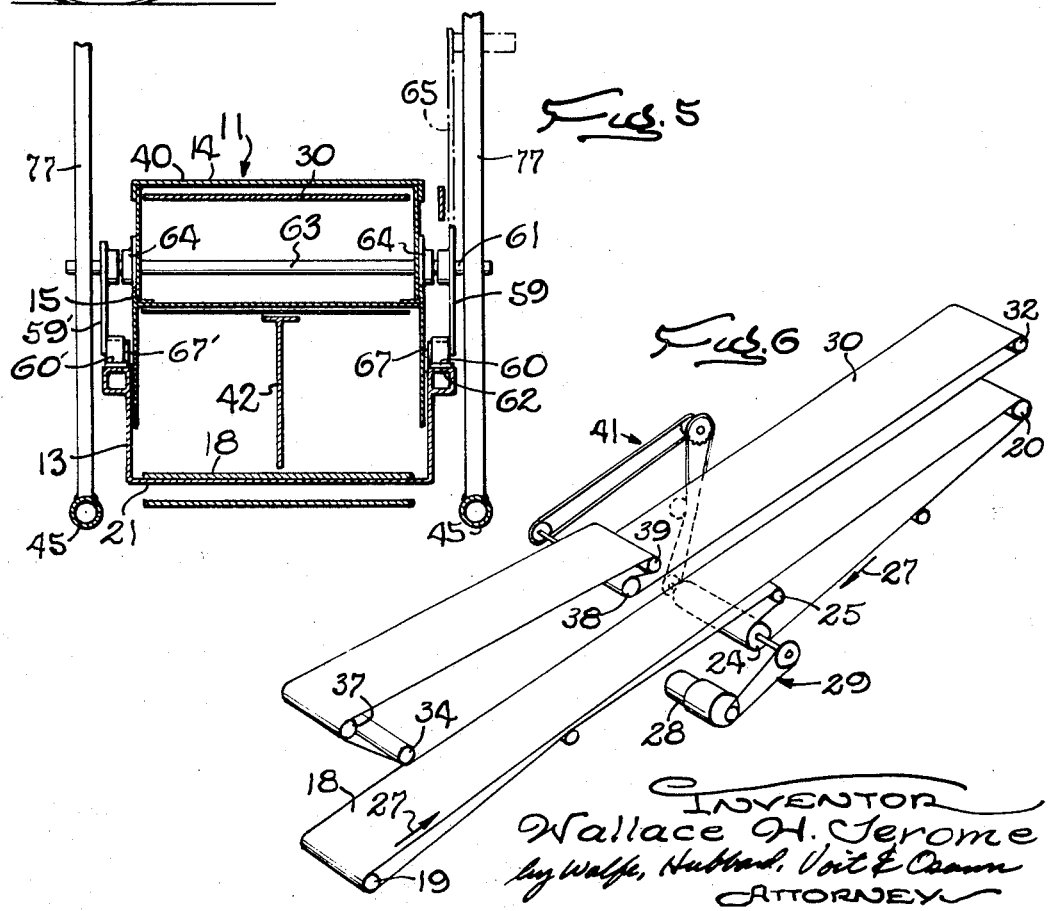
INVENTOR
Wallace H. Jerome
by Wolfe, Hubbard, Voit & Osann
ATTORNEY

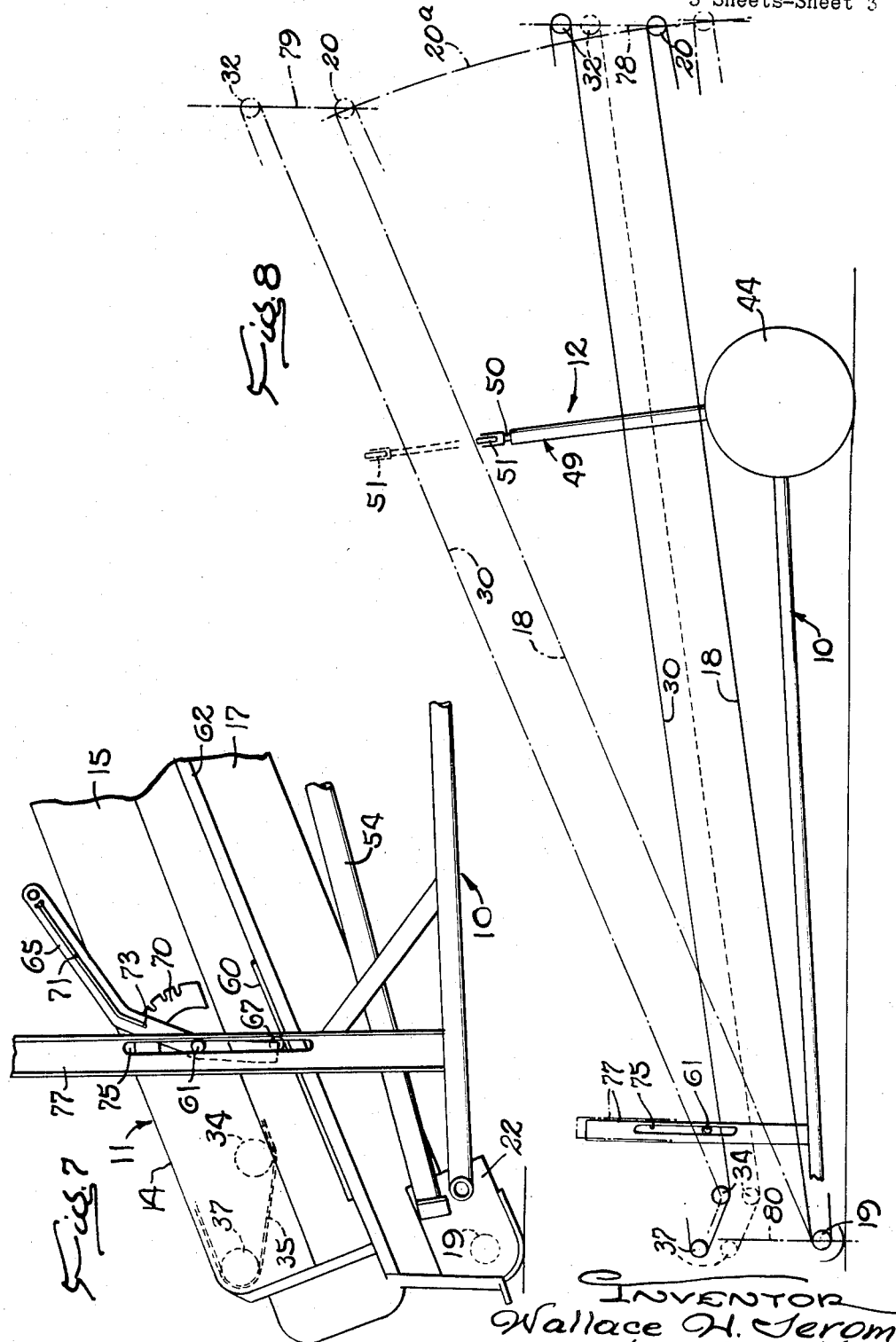

United States Patent Office 3,476,089
Patented Nov. 4, 1969

3,476,089
POULTRY LOADING DEVICE
Wallace H. Jerome, c/o Jerome Foods, 34 N. 7th St., Barron, Wis. 54812
Filed Nov. 17, 1967, Ser. No. 683,836
Int. Cl. A01k 29/00, 45/00; B65q 15/10
U.S. Cl. 119—82                                15 Claims

ABSTRACT OF THE DISCLOSURE

A poultry loading device having an elongated chute supported in an inclined position on a ground-engaging frame with a pivot at the lower end of the chute and a hoisting mechanism spaced from the pivot to raise and lower the upper end of the chute relative to the frame. The chute is formed by a lower trough of upwardly opening U-shaped cross-section that is pivoted at one end on the frame, and a cover in the form of an inverted U-shaped trough adjustably supported on the lower trough. A conveyor belt on the lower trough carries poultry through the chute while an overhead belt on the upper trough holds the poultry from above, and a central divider maintains two separated rows of poultry in the chute. To vary the height of the passage in the chute, two adjusting devices are spaced apart longitudinally of the chute and include levers pivoted on the sides of the upper trough with follower rollers on the levers engaging upwardly facing tracks on the lower trough to lift or lower the upper trough according to the position of the levers, which are latched releasably in different positions. A pair of vertical guides on opposite sides of the chute engage followers on the upper trough to maintain the ends of the latter in fixed vertical relation with the ends of the lower trough regardless of the spacing of the troughs or the angular position of the chute, and the sidewalls of the troughs terminate short of the upper end to leave side access openings at the upper end of the chute.

Background of the invention

This invention relates to a device for loading live poultry into and out of vehicles and, more particularly, to a loader having an inclined covered chute and an adjustable cover for varying the height of the passage within the chute, the chute being supported on a frame for angular adjustment to raise and lower the upper end of the chute to different levels. One such loader is disclosed in my copending application Ser. No. 574,078, filed on Aug. 22, 1966, now Patent No. 3,389,780 and the present invention constitutes an improvement over parts of the loader there disclosed.

Summary of the invention

The primary object of the present invention is to provide an angular adjustable chute having a movable cover with opposite ends that are maintained generally in vertical alinement with the ends of the lower portion of the chute automatically as an incident to changes in the angle of the chute, thereby to facilitate loading of poultry into and out of the ends of the chute in all angular positions thereof, and in which the adjustment of the passage height may be accomplished quickly and easily with novel adjusting devices spaced along the chute. More specifically, the longitudinal position of the cover relative to the frame is fixed to maintain the ends of the cover in fixed vertical planes regardless of the angle of the chute, sliding the cover automatically relative to the lower portion of the chute as the angle changes, and the adjusting devices include levers each pivoted on one portion of the chute and engaging a longitudinal track on the other portion to lift and lower the cover as the levers are swung back and forth about their pivots. The invention also resides in the novel manner of constructing and mounting the adjusting devices, and of combining one of these devices with the alinement mechanism.

Other objects and advantages will become apparent as the following description proceeds, taken in conjunction with the accompanying drawings.

Brief description of the drawings

FIGURE 1 is a side elevational view of the basic parts of a loader embodying the novel features of the present invention, a raised position of the chute being indicated in broken lines.

FIG. 2 is an enlarged fragmentary side elevation showing the lower end portion of the loader.

FIG. 3 is an enlarged cross-sectional view taken substantially along the line 3—3 of FIG. 1.

FIG. 4 is an enlarged fragmentary side elevation showing the upper end portion of the loader.

FIG. 5 is an enlarged fragmentary cross-section taken substantially along the line 5—5 of FIG. 2.

FIG. 6 is a schematic perspective view of the belts of the loader.

FIG. 7 is a view similar to FIG. 2 with the chute in a raised position.

FIG. 8 is a diagrammatic view illustrating the relationships of basic parts in different angular positions of the chute.

Description of the preferred embodiment

As shown in the drawings for purposes of illustration, the invention is embodied in a device for loading live poultry such as turkeys into and out of the usual vehicles (not shown) in which turkeys are transported, such vehicles having several tiers of compartments or cages on each side with doors through which the turkeys are loaded and unloaded. In view of the fact that a single processer may handle several million turkeys each, it will be evident that the loading of the trucks is a tremendous job, particularly if performed manually as has been the general practice in the turkey industry.

The basic elements of the loader, as disclosed in my copending application previously referred to, include a frame 10 and a chute 11 pivotally supported at one end on the frame and adjustably supported adjacent its other end by a hoisting mechanism 12 for raising and lowering the upper end of the chute and thereby changing the angular position of the chute. In addition, the chute is formed in two relatively movable parts, the lower part comprising an elongated trough 13 of U-shaped cross-section, and a cover 14 which herein is of inverted U-shaped cross-section with sidewalls 15 that fit inside the sidewalls 17 of the lower trough as shown in FIGS. 3 and 5.

To carry turkeys through the chute 11, an endless conveyor belt 18 is trained around horizontal guide rolls 19 and 20 supported on the lower trough adjacent the opposite ends thereof with the upper run of the belt extending along the bottom wall 21 of the trough and the return run below the trough. One supporting roll 19 is journaled between two plates 22 fastened to the lower end of the lower trough and forming a skid for the frame, and the other is journaled between two spaced parallel bars 23 projecting outwardly from the sidewalls of the lower trough at the upper end thereof to form continuations of the trough walls. In addition, the belt preferably extends around other rolls (24 and 25) beneath the trough for driving the belt in a selected direction, usually to load turkeys from the ground into a truck as indicated by the arrows 27 in FIG. 6. The drive for the belt also should be reversible for unloading, and for this purpose the roll 24 is reversibly driven by a motor 28 through a chain-and-sprocket drive 29.

The illustrative loader also is equipped with an overhead belt 30 supported on the cover trough 14 with the lower run of the belt closely adjacent the top wall 31 of the chute and the upper or return run above this wall, thereby forming a moving ceiling for the passage within the chute. This belt is trained around one horizontal roll 32 journaled between the sidewalls 15 of the upper trough at the upper end thereof, between bearing plates shown at 33 (FIG. 4), and passes under another roll 34 spaced a short distance from the lower end of this trough, then being inclined upwardly at 35 to a third roll 37 journaled between the sidewalls at the lower end of the trough. Supported in this manner, the two belts converge upwardly at the lower end of the chute to facilitate the feeding of turkeys into the lower end, the usual entry end. Suitable drive rolls 38 and 39 (FIG. 6) for the overhead belt are disposed above the upper trough along the return run of this belt, which preferably is protected by a sheet metal cover 40 as shown in FIGS. 3 and 5. The roll 38 is driven by the motor 28 through a chain drive 41, and the chute passage preferably is divided longitudinally by an elongated vertical plate 42 supported at its ends on the upper trough so that two separated rows of turkeys may be conveyed at one time.

As shown in FIGS. 1, 2 and 4, the frame 10 comprises an axle 43 extending between the wheels 44 and connected to the front ends of two bars 45 which extend rearwardly to the horizontal pivot 47 for the chute, and two posts 48 extending upwardly from the axle on opposite sides of the chute and preferably connected across their upper ends. The hoisting mechanism 12 is formed by two cylinders 49 extending upwardly from the axle alongside the posts 48 with piston rods 50 projecting out of the upper end of the cylinders and carrying pulleys 51 which are guided by sleeves 52 for up-and-down movement along the posts. A cable 53 anchored at one end on the frame extends upwardly over each pulley and back down along the side of the chute, and is anchored to the chute so that upward motion of the pulleys in response to the delivery of pressure fluid to the cylinders correspondingly raises the chute.

Herein, the lower trough 13 of the chute 11 is supported and braced by a cradle-like framework formed by elongated curved bars 54 each fastened at one end to the skid plates 22 on the lower end of the trough and at the other end to the sidewalls of the trough as by welding at 55 (FIGS. 1 and 4). The cables 53 are fastened to this framework to change the angle of the chute.

In accordance with the present invention, the upper cover or trough 14 is supported in a novel manner for quick and easy adjustment relative to the lower trough 13 to simplify and expedite the changing of the height of the chute passage for different sizes of poultry, making it possible to change the passage height with a minimum of trouble and time loss to suit the particular size of poultry to be handled at a given time. In addition, the upper trough, although movable vertically relative to the lower trough, is held with its ends in general vertical alinement with the ends of the lower trough in all angular positions of the chute. As a result, the chute may be positioned with both the end of the cover and the end of the lower trough close to the sides of the cages to be loaded or unloaded, and the opposite ends always are vertically alined to facilitate the insertion and removal of turkeys.

For these purposes, the cover trough 14 is supported on the lower trough 13 by two adjusting devices 57 and 58 each including a lever 59, pivoted on one of the troughs and engaging a longitudinal track 60 on the other trough so that swinging of the lever about its pivot 61 changes the vertical spacing of the track and the pivot. Mechanism is provided for holding each lever releasably in several different angular positions and thus holding the cover trough at several different heights. Moreover, the upper trough is tied to the frame by guide-and-follower elements that permit raising of the cover trough relative to the frame and the lower trough but prevent longitudinal motion of the cover trough relative to the frame. Accordingly, this assists the lever 59 in raising and lowering the cover trough and, at the same time, automatically adjusts the longitudinal position of the upper trough relative to the lower trough as the chute angle is changed.

In this instance, the pivots are carried on the cover trough 14 and the tracks 60 are on the lower trough 13, herein on outwardly turned flanges 62 (FIGS. 3 and 5) extending along the longitudinal edges of the sidewalls 17 of the trough and each constituting one side of a hollow rectangular tube integral with the trough sidewall. As shown most clearly in FIGS. 1, 2 and 5, the pivot 61 of the lower or left lever, as viewed in FIG. 1, is the projecting end of a rod 63 extending transversely through the upper trough between the runs of the overhead belt 30 and journaled on the sidewalls 15 in bearings 64 (FIG. 5). The lever is fastened between its ends to this rod with one end portion 65 extending to the right to form a handle, and the opposite end portion, indicated at 59, inclined downwardly to the left toward the track with a roller 67 journaled on the lower end of the lever and engaging the track.

As shown in FIGS. 1 and 3, the pivot 61 of the upper or right lever 59 is similarly formed by a rod 63 extending through the upper trough 14 and journaled in bearings 64, and the handle 65 of the lever extends upwardly to the left while the opposite end portion is inclined downwardly to the right from the pivot, also with a roller 67 on its free end engaging the track 60. A strap 68 overlies the track and is bolted at 69 thereto to confine the roller both vertically and longitudinally to a selected length of travel. In each case, a bearing plate may be fastened to the flange 62 to engage the roller 67.

On the opposite side of the chute 11, two levers 59' are fastened to the projecting ends of the rods 63 (see FIGS. 3 and 5) in angular alinement with both of the free lever end portions on the other side, and carry rollers 67' which engage similar tracks 60' formed on the lower trough 13. Thus, as one of the levers 59 is turned about the axis defined by the associated pivot rod 63, the lever 59' on the rod also turns to raise or lower both sides of the cover trough equally and simultaneously.

The mechanism for holding each lever 59 in a selected angular position is of well known construction including a notched arcuate latch plate 70 fastened to the sidewall 15 of the cover 14, and a latch rod 71 (see FIG. 2) disposed alongside the handle and having a right-angle bend at 73 with a latching end extending through the lever to seat in one of the notches. A spring 74 acts between the handle and the rod to urge the latter toward the latch plate so that the lever can be released for swinging only by pulling the latch rod free of the selected notch.

To insure that angular movement of the rollers 67, 67' on the levers 59, 59' is transmitted to the cover 14 as vertical movement, the opposite end portions of the lower rods 63 project laterally beyond the two levers and extend into elongated vertical guide slots 75 formed in two posts 77 upstanding from the frame rods 45 along opposing sides of the chute. Thus, the cover trough is tied to the frame against relative longitudinal movement and can only move vertically relative to the frame. In addition, this typing of the cover trough to the frame has the important advantage of maintaining the ends of the cover trough, represented by the rolls 32 and 37, in a fixed vertical relationship with the ends of the lower trough, represented by the rolls 19 and 20. Since the lower end of the lower trough is fixed by the chute pivot 47 longitudinally with respect to the frame, and the ends of the cover trough are fixed by the pivots 61 and guides 75, as far as longitudinal position is concerned, the ends must remain in substantially the same vertical relationship in all angular positions of the chute.

This is illustrated schematically in FIG. 8 by the reference lines 78 and 79 at the upper end of the chute and by the line 80 at the lower end. It will be seen in FIG. 8 that the end roll 20 of the conveyor belt follows an arcuate path 20a during adjustment of the chute position, and that the end roll 32 of the hold-down belt 30 remains in the same vertical relationship with the roll 20 in all chute positions. An intermediate position of the chute is indicated in solid lines, while a lowered position is shown in dash lines and a raised position is shown in dot-dash lines. The relationship at the lower end in different angular positions will be readily apparent from a comparison of FIGS. 2 and 7.

In service use, this fixing of the relationship of the ends makes it possible to position the upper end of the chute squarely against the side of a truck regardless of the height of the particular cage or cages to be loaded or unloaded. This provides optimum confinement of turkeys, from above and below, and makes it possible to transfer turkeys between the chute and the cage with a minimum of difficulty. At the bottom, the roll 37 is maintained in general vertical alinement with the roll 19 to avoid a longitudinal offset of the ends of the two conveyors that otherwise would result, and this facilitates the insertion of turkeys in the chute.

It will be seen in FIGS. 2 and 4 that the sidewalls 15, 17 of the two troughs terminate short of the ends of the conveyor belt 18 and the hold-down belt 30, leaving the sides of the chute open adjacent the upper end. This provides access space for operators standing beside the chute on the operator's platform 81 slung below the upper end, and enables the operators to guide turkeys from the chute into cages with a smooth and uninterrupted motion. The upper end portion of the divider plate 42 maintains the separation of the two rows of turkeys during this guiding.

I claim as my invention:

1. In a device for loading poultry having, in combination, an elongated chute formed by a trough of upwardly opening U-shaped cross-section and a cover constituting a ceiling for said chute and defining an enclosed passage, said cover having ends in general vertical alinement with the ends of said trough, a frame for supporting said chute on the ground and having a horizontal first pivot connected to said chute adjacent one end thereof, mechanism on said frame for raising and lowering the free end of said chute to vary the angle of the chute relative to the ground, a guide fast on said frame and disposed in a vertical position alongside said chute at a point spaced from said pivot, a follower on said cover projecting laterally therefrom and movably engaging said guide whereby said guide and said follower coact to maintain said cover ends in a fixed vertical relation with said trough ends during angular adjustment of said chute, and a pair of adjusting devices spaced apart longitudinally of said chute and each having a lever disposed alongside said chute, a second pivot supporting said lever on said cover for swinging about a horizontal axis transverse to said chute, a longitudinal track on said trough facing upwardly for engagement with said lever, and means for holding said lever in a plurality of different angular positions with said lever in engagement with said track thereby to adjust the vertical spacing of said second axis from said track and vary the height of said passage, said guide and said follower also maintaining said cover ends in said planes during adjustment of said spacing.

2. A poultry loading device as defined in claim 1 in which said guide is a vertical slot formed in a post fast on said frame and disposed alongside said chute, said follower being movably received in said slot.

3. A poultry loading device as defined in claim 2 including a second post disposed on the opposite side of said chute and having a second vertical slot alined with the first-mentioned slot, and further including a rod carried by said cover and having opposite end portions projecting into said slots to form a follower for each slot.

4. A poultry loading device as defined in claim 3 in which said lever of one of said adjusting devices is fast on said rod and the latter is rotatably supported on said cover to form one of said second pivots, and further including a second lever on said rod on said opposite side of said chute and a second longitudinal track engageable with said second lever, said second lever being angularly alined with the first-mentioned lever to move therewith.

5. A poultry loading device as defined in claim 1 in which said tracks comprise upwardly facing surfaces extending along both free longitudinal edges of said trough and formed by flanges extending laterally outwardly from said trough, said cover comprising a second trough of inverted U-shaped cross-section having sidewalls telescoping downwardly within the first-mentioned trough.

6. A poultry loading device as defined in claim 1 in which at least one sidewall of said trough terminates short of said free end to leave an access opening in said one side of the chute with the bottom and top of the chute extending across the bottom and top of the access opening for vertical confinement of poultry.

7. In a device for loading poultry having, in combination, an elongated chute formed by a first trough of upwardly opening generally U-shaped cross-section and a similar second trough of inverted U-shaped cross-section disposed above said first trough to define an enclosed passage, a conveyor belt supported on said first trough to carry poultry through said chute, an overhead belt supported on said second trough and having a lower run forming a moving ceiling for said passage, and a pair of adjusting devices spaced apart longitudinally of said chute and each having a lever disposed alongside the chute, a pivot on one of said troughs supporting the lever for swinging about a horizontal axis transverse to the chute, a track on the other of said troughs facing toward said pivot for engagement with the free end portion of said lever, and means for holding said lever in a plurality of different angular positions with said lever in engagement with said track whereby the height of said passage is adjusted by changing the angular position of the lever to change the vertical spacing of said pivot from said track.

8. A poultry loading device as defined in claim 7 in which said chute is supported on a frame in an inclined position and for angular adjustment relative to the frame to raise and lower the free end of said chute, and further including means operable as an incident to such angular adjustment to shift said second trough longitudinally relative to said first trough to maintain the ends of said troughs in vertical alinement in different angular positions of the chute.

9. A poultry loading device as defined in claim 8 in which said shifting means comprise a guide disposed in a fixed vertical position on said frame alongside said chute, and a follower on said second trough engaging and movable along said guide as the angle of said chute changes relative to the guide, whereby said guide cams said second trough longitudinally of said first trough during changing of said angle.

10. A poultry loading device as defined in claim 9 in which said follower is a continuation of the pivot of one of said adjusting devices.

11. A poultry loading device as defined in claim 8 in which the sidewalls of both of said troughs terminate short of said free end on at least one side of the chute to lease an access opening in the side of the chute with the top and bottom of the chute extending across the top and bottom of said access opening.

12. In a device for loading poultry having, in combination, an elongated chute formed by an elongated bottom member and a movable cover constituting a ceiling for said chute and having ends in general vertical alinement with the ends of said bottom member, means for conveying poultry through said chute, a frame supporting said chute in an inclined position and for angular adjustment relative to the frame thereby to raise and lower one end of the chute, and means acting between said frame and said cover and operable as an incident to angular adjustment of the chute to slide said cover longitudinally of said trough and maintain the ends of said cover in general vertical alinement with the ends of said bottom member in different angular positions of the chute.

13. A poultry loading device as defined in claim 12 in which said means comprise a guide fast on said frame and disposed in a vertical position alongside said chute, and a follower on said cover projecting laterally therefrom and movably engaging said guide to slide along the latter as the angle of said chute changes whereby said guide cams said follower longitudinally back and forth relative to said bottom member to shift said cover endwise relative to said chute as said one end is raised and lowered.

14. A poultry loading device as defined in claim 12 further including two adjusting devices longitudinally spaced along said chute and each including a lever pivoted on said cover, an upwardly facing track on said bottom member generally below said lever, means on said lever engaging said track to raise and lower the cover relative to said bottom member as the lever is swung back and forth, and means for holding the lever in different angular positions.

15. A poultry loading device as defined in claim 14 in which each of said devices includes a pivot rod supporting the lever on one side of the chute, and also supporting a second lever on the other side of the chute in engagement with a second upwardly facing track thereby to raise both sides of said cover equally and in unison.

References Cited

UNITED STATES PATENTS

| | | | |
|---|---|---|---|
| 216,126 | 6/1879 | Ainsworth | 198—165 |
| 614,392 | 11/1898 | Jacobs | 198—165 |
| 1,356,733 | 10/1920 | Nightingale | 198—233 |
| 1,502,776 | 7/1924 | Holser et al. | 198—233 |
| 1,808,237 | 6/1931 | Liggett | 198—233 |
| 2,840,041 | 6/1958 | Fleming | 119—82 |
| 2,844,240 | 7/1958 | Buck | 198—7 |
| 3,103,915 | 7/1963 | Crain et al. | 119—82 |
| 3,389,780 | 6/1968 | Jerome | 119—82 X |

ALDRICH F. MEDBERY, Primary Examiner

U.S. Cl. X.R.

198—165, 204